US012401109B2

(12) United States Patent
Chien et al.

(10) Patent No.: US 12,401,109 B2
(45) Date of Patent: Aug. 26, 2025

(54) ANTENNA-IN-PACKAGE WITH HEAT DISSIPATION STRUCTURE

(71) Applicant: Industrial Technology Research Institute, Hsinchu (TW)

(72) Inventors: Heng-Chieh Chien, New Taipei (TW); Shu-Jung Yang, New Taipei (TW); Feng-Hsiang Lo, Hsinchu County (TW); Yu-Lin Chao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 18/474,239

(22) Filed: Sep. 26, 2023

(65) Prior Publication Data

US 2025/0105486 A1 Mar. 27, 2025

(51) Int. Cl.

| | |
|---|---|
| ***H01Q 1/02*** | (2006.01) |
| ***H01Q 9/04*** | (2006.01) |
| *H01Q 1/22* | (2006.01) |

(52) U.S. Cl.

CPC ............. *H01Q 1/02* (2013.01); *H01Q 9/0407* (2013.01); *H01Q 1/2283* (2013.01)

(58) Field of Classification Search

None

See application file for complete search history.

(56) References Cited

U.S. PATENT DOCUMENTS

| | | | |
|---|---|---|---|
| 11,482,472 B2 | 10/2022 | Eid et al. | |
| 2018/0198290 A1* | 7/2018 | Rohera | H02J 1/108 |
| 2022/0273303 A1* | 9/2022 | Creamer | G16H 20/40 |
| 2022/0399249 A1 | 12/2022 | Dogiamis et al. | |

(Continued)

FOREIGN PATENT DOCUMENTS

| | | |
|---|---|---|
| CN | 215579018 | 1/2022 |
| CN | 115810594 | 3/2023 |
| TW | 200425430 | 11/2004 |

(Continued)

OTHER PUBLICATIONS

Xiaoxiong Gu et al., "Packaging and Antenna Integration for Silicon-Based Millimeter-Wave Phased Arrays: 5G and Beyond", IEEE Journal of Microwaves, Jan. 7, 2021, pp. 123-134, vol. 1, No. 1.

(Continued)

*Primary Examiner* — Wilson Lee

(74) *Attorney, Agent, or Firm* — JCIPRNET

(57) ABSTRACT

An antenna-in-package with a heat dissipation structure includes a circuit board, an antenna substrate, a chip, a plurality of heat dissipation fins, a chassis, and dielectric fluid. The circuit board has a first surface and a second surface opposite to the first surface. The antenna substrate is disposed above the first surface of the circuit board. The chip is disposed between the antenna substrate and the first surface of the circuit board and is electrically connected to the antenna substrate. The plurality of heat dissipation fins protrude from the second surface of the circuit board. The chassis encapsulates the circuit board, the antenna substrate, the chip, and the plurality of heat dissipation fins. The dielectric fluid circulates and flows in the chassis through a cooling circulation device and is in direct contact with the plurality of heat dissipation fins.

26 Claims, 10 Drawing Sheets

(56) References Cited

U.S. PATENT DOCUMENTS

| | | | | |
|---|---|---|---|---|
| 2024/0178163 | A1* | 5/2024 | Tang | H01Q 13/106 |
| 2024/0222874 | A1* | 7/2024 | Tai | H01Q 25/001 |

FOREIGN PATENT DOCUMENTS

| | | |
|---|---|---|
| TW | 201926796 | 7/2019 |
| TW | I672864 | 9/2019 |

OTHER PUBLICATIONS

Xiaoxiong Gu et al., "Electrical, Mechanical, and Thermal Co-Design", Antenna-in-Package Technology and Applications, First Edition, 2020, pp. 89-113.

* cited by examiner

ANTENNA-IN-PACKAGE WITH HEAT DISSIPATION STRUCTURE

TECHNICAL FIELD

The disclosure relates to a package structure, and in particular, relates to an antenna-in-package with a heat dissipation structure.

BACKGROUND

With the development of the 5G communication industry and low-orbit satellite applications, the introduction of high-power chips and the miniaturization trend of chips will cause the temperature of the antenna-in-package module to increase. Generally speaking, antenna-in-package modules transfer the heat generated by the chip to the air through thermal diffusion elements. However, due to the module structure, the air flow within the module is poor, making it difficult to dissipate heat such that the energy conversion efficiency of the chip is reduced and the system energy consumption is increased. Therefore, how to improve the heat dissipation efficiency of the antenna-in-package module is an urgent problem that needs to be solved.

SUMMARY

The disclosure provides an antenna-in-package with a heat dissipation structure having a favorable heat dissipation capability to improve the reliability of the antenna-in-package with the heat dissipation structure.

An antenna-in-package with a heat dissipation structure according to an embodiment of the disclosure includes a circuit board, an antenna substrate, a chip, a plurality of heat dissipation fins, a chassis, and dielectric fluid. The circuit board has a first surface and a second surface opposite to the first surface. The antenna substrate is disposed above the first surface of the circuit board. The chip is disposed between the antenna substrate and the first surface of the circuit board and electrically connected to the antenna substrate. The plurality of heat dissipation fins protrude from the second surface of the circuit board. The chassis encapsulates the circuit board, the antenna substrate, the chip, and the plurality of heat dissipation fins. The dielectric fluid circulates and flows in the chassis through a cooling circulation device and is in direct contact with the plurality of heat dissipation fins.

An antenna-in-package with a heat dissipation structure according to another embodiment of the disclosure includes a circuit board, an antenna substrate, a chip, a chassis, and dielectric fluid. The circuit board has a first surface and a second surface opposite to the first surface. The antenna substrate is disposed above the first surface of the circuit board. The antenna substrate includes an antenna layer disposed on a surface of the antenna substrate. The chip is disposed between the antenna substrate and the first surface of the circuit board and electrically connected to the antenna substrate. The chassis encapsulates the circuit board, the antenna substrate, and the chip. The dielectric fluid circulates and flows in the chassis through a cooling circulation device and is in direct contact with the antenna layer.

An antenna-in-package with a heat dissipation structure according to another embodiment of the disclosure includes a chassis, a circuit board, an antenna substrate, a chip, a heat dissipation fin, and cooling fluid. The chassis includes a first space and a second space. The first space and the second space are isolated from each other by a heat dissipation plate. The circuit board is located in the first space and disposed on the heat dissipation plate. The antenna substrate is located in the first space and disposed above the circuit board. The chip is disposed between the antenna substrate and the circuit board and electrically connected to the antenna substrate. The heat dissipation fin is located in the second space and disposed on the heat dissipation plate. The cooling fluid is located in the second space and in contact with the heat dissipation fin. The cooling fluid absorbs heat from the heat dissipation fin to create a phase change.

Based on the above, the antenna-in-package with the heat dissipation structure of the disclosure improves the heat dissipation efficiency thereof through the provision of the dielectric fluid or the cooling fluid, so that the antenna-in-package with the heat dissipation structure is adapted to be applied in the 5G communication industry and low-orbit satellite ground stations.

In order to make the above-mentioned features and advantages of the disclosure clearer and easier to understand, the following embodiments are given and described in details with accompanying drawings as follows.

DETAILED DESCRIPTION OF DISCLOSURED EMBODIMENTS

Figure 1A:
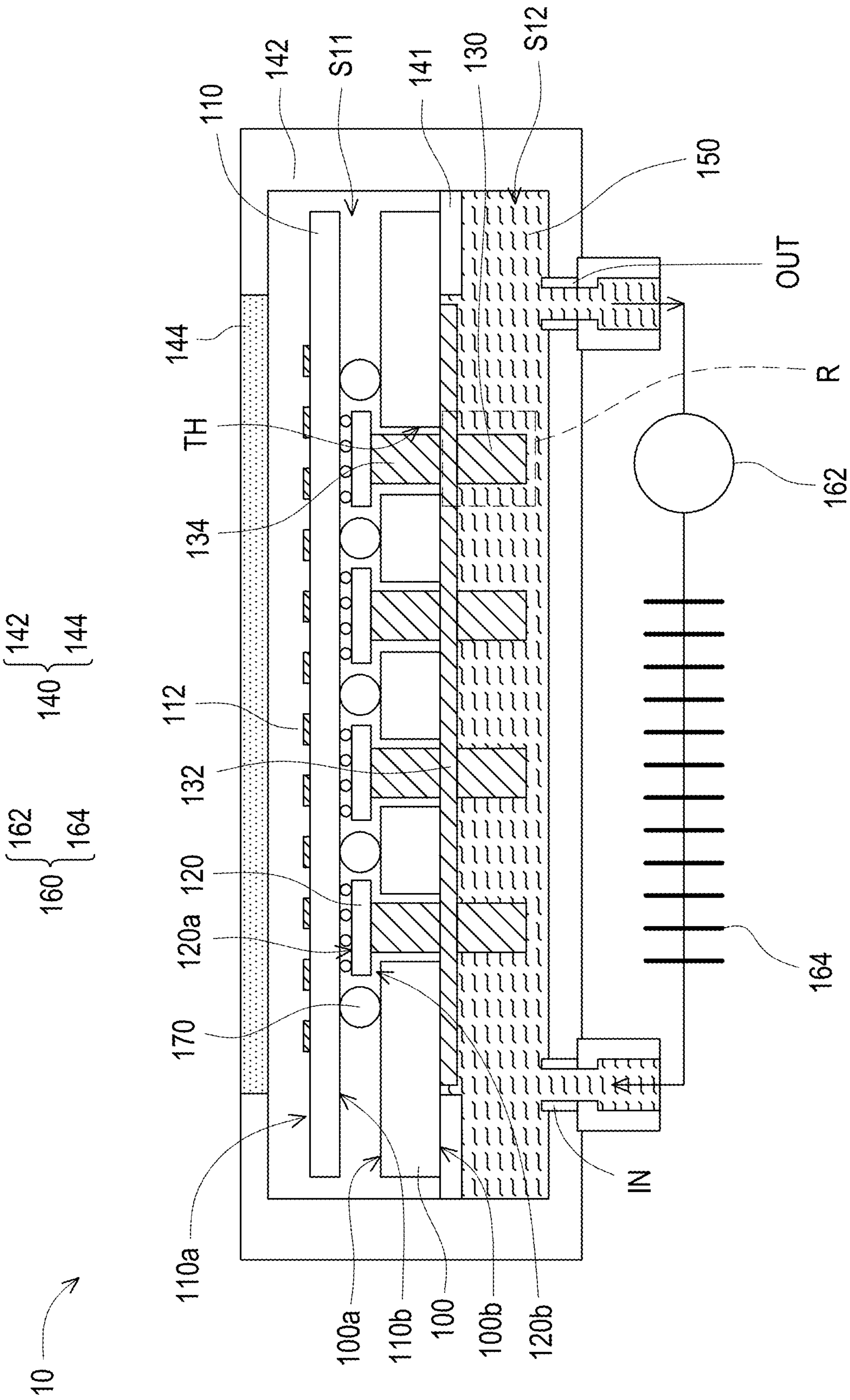
FIG. 1A is a schematic cross-sectional view of an antenna-in-package with a heat dissipation structure according to an embodiment of the disclosure.

Illustrative embodiments of the disclosure will be fully described below with reference to the drawings, but the disclosure may also be embodied in many different forms and should not be construed as being limited to the embodiments described herein. In the drawings, for clarity's sake, the size and thickness of various regions, parts, and layers may not be drawn to scale.

Directional terms, such as "upper", "lower", "front", "back", "left", "right", etc., mentioned in the disclosure are only directions with reference to the drawings. Therefore, the used directional terms are used to illustrate, but not to limit, the disclosure.

In the following embodiments, the same or similar elements are denoted by the same or similar referential numerals, and descriptions of the same technical contents are omitted. Moreover, the features in the different exemplary embodiments may be combined with each other in case of no confliction, and the simple equivalent changes and modifications made in accordance with the scope of the specification or the claims are still within the scope of the patent.

It should be noted that although the terms "first," "second," "third," etc. may be used herein for describing various elements, components, regions, layers, and/or portions, the elements, components, regions, and/or portions are not limited by these terms. These terms are used for separating one element, component, region, layer, or portion from another element, component, region, layer, or portion. Thus, the first element, component, region, layer, or portion discussed below may also be referred to as the second element, component, region, layer, or portion without departing from the scope of the invention.

Figure 1B:
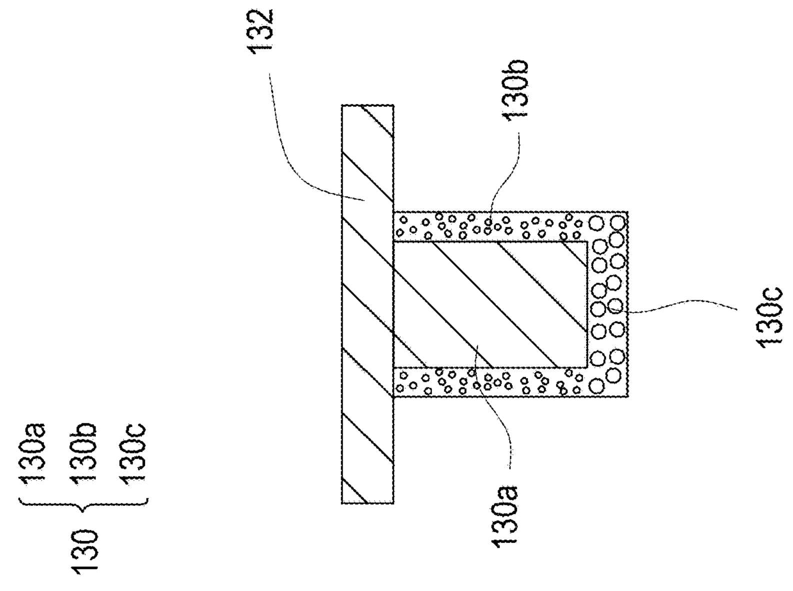
FIG. 1B is a partially enlarged schematic cross-sectional view of an embodiment of the antenna-in-package with the heat dissipation structure of FIG. 1A.
Figure 1C:
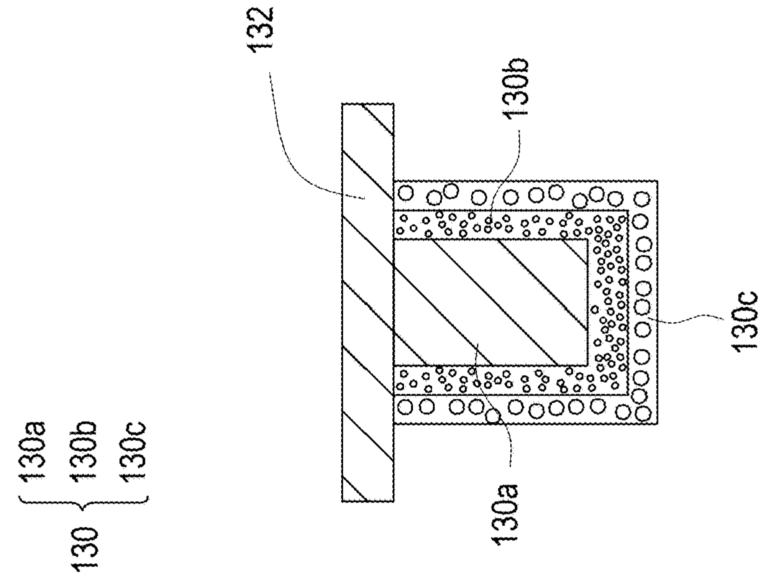
FIG. 1C is a partially enlarged schematic cross-sectional view of another embodiment of the antenna-in-package with the heat dissipation structure of FIG. 1A.
Figure 1D:
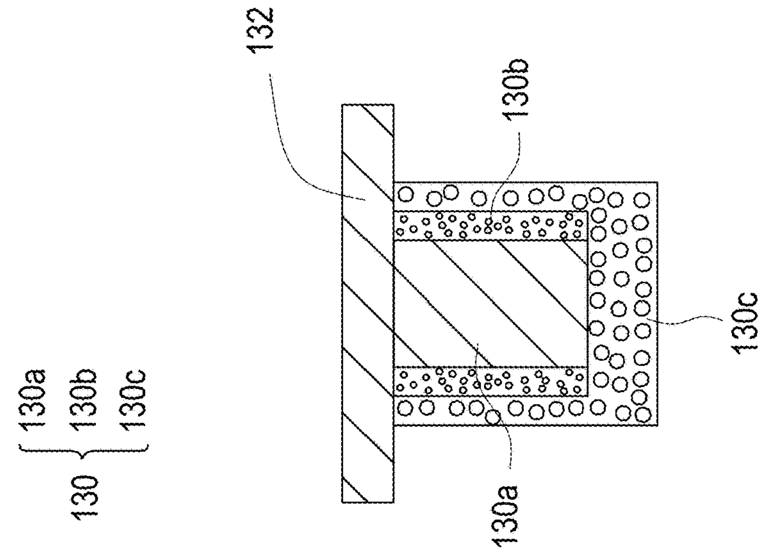
FIG. 1D is a partially enlarged schematic cross-sectional view of another embodiment of the antenna-in-package with the heat dissipation structure of FIG. 1A.

FIG. 1A is a schematic cross-sectional view of an antenna-in-package with a heat dissipation structure according to an embodiment of the disclosure. FIG. 1B is a partially enlarged schematic cross-sectional view of an embodiment of the region R of FIG. 1A. FIG. 1C is a partially enlarged schematic cross-sectional view of another embodiment of the region R of FIG. 1A. FIG. 1D is a partially enlarged schematic cross-sectional view of another embodiment of the region R of FIG. 1A.

Referring to FIG. 1A, an antenna-in-package with a heat dissipation structure 10 includes a circuit board 100, an antenna substrate 110, a chip 120, a plurality of heat dissipation fins 130, a chassis 140, and a dielectric fluid 150. The circuit board 100 has a first surface 100*a* and a second surface 100*b* opposite to the first surface 100*a*. The antenna substrate 110 is disposed above the first surface 100*a* of the circuit board 100. The chip 120 is disposed between the antenna substrate 110 and the first surface 100*a* of the circuit board 100 and is electrically connected to the antenna substrate 110. The plurality of heat dissipation fins 130 protrude from the second surface 100*b* of the circuit board 100. The chassis 140 encapsulates the circuit board 100, the antenna substrate 110, the chip 120, and the heat dissipation fins 130. The dielectric fluid 150 circulates and flows in the chassis 140 through a cooling circulation device 160 and is in direct contact with the plurality of heat dissipation fins 130.

The detailed structures of the circuit board 100 and the antenna substrate 110 are omitted in FIG. 1A. However, the circuit board 100 and the antenna substrate 110 may include structures such as conductive lines, insulating layers, via holes, active/passive components, etc., and the wiring design thereof may be based on actual requirements, and the disclosure is not limited thereto.

The circuit board 100 may be electrically connected to the antenna substrate 110 through a conductive connecting member 170. In some embodiments, the conductive connecting member 170 may be a solder ball, a conductive pillar, a conductive bump, or a similar conductive connecting member, but the disclosure is not limited thereto.

The antenna substrate 110 has an upper surface 110*a* and a lower surface 110*b* that are opposite to each other, and the lower surface 110*b* faces the first surface 100*a* of the circuit board 100. The antenna substrate 110 includes an antenna layer 112, which is disposed on the upper surface 110*a* of the antenna substrate 110.

The chip 120 is, for example, a radio frequency chip (RF IC), which includes a front surface 120*a* and a back surface 120*b* that are opposite to each other. The front surface 120*a* of the chip 120 faces the lower surface 110*b* of the antenna substrate 110 and may be electrically connected to the antenna substrate 110 through, for example, solder balls or other conductive structures.

In some embodiments, the chassis 140 includes at least one inlet portion IN and at least one outlet portion OUT serving as an inlet and outlet for the dielectric fluid 150 to enter and exit the inside and outside of the chassis 140. In FIG. 1A, an inlet portion IN and an outlet portion OUT are schematically shown at the lower part of the chassis 140, but the disclosure is not limited thereto. The number and position of the inlet portion and the outlet portion of the chassis 140 may be adjusted according to actual requirements.

In some embodiments, the cooling circulation device 160 includes a pump 162 and a heat exchanger (fin, heat sink, etc.) 164 that are disposed on the outside of the chassis 140. The dielectric fluid 150 may be drawn out from the at least one outlet portion OUT of the chassis 140 by the pump 162 and passed through the heat exchanger 164 so as to dissipate the heat of the dielectric fluid 150 to the outside, and the dielectric fluid 150 flowing through the heat exchanger 164 is then returned to the inside of the chassis 140 through the at least one inlet portion IN. Such a cyclic operation may improve the heat dissipation efficiency.

The outlet portion OUT of the chassis 140 and the pump 162, the pump 162 and the heat exchanger 164, and the heat exchanger 164 and the inlet portion IN may be connected through pipes (not shown) to serve as channels for the dielectric fluid 150 to flow. In some embodiments, the heat exchanger 164 may be a fin heat sink or other suitable heat sinks, but the disclosure is not limited thereto.

In some embodiments, the antenna-in-package with the heat dissipation structure 10 further includes a heat dissipation plate 132, which is disposed on the second surface 100*b* of the circuit board 100, and the heat dissipation fins 130 are disposed on the heat dissipation plate 132. In this way, the heat of the circuit board 100 may be dissipated through the heat dissipation plate 132 and the heat dissipation fins 130. Then, through the dielectric fluid 150 being in direct contact with and the heat dissipation plate 132 and/or the heat dissipation fins 130, the heat energy thereof may be taken away and dissipated to the outside of the chassis 140 through the cooling circulation device 160.

In some embodiments, the surface of the heat dissipation plate 132 in contact with the dielectric fluid 150 may have a plurality of micro-bumps or micro-dimples (not shown) to increase the disturbance of the dielectric fluid 150 in the chassis 140.

In some embodiments, the circuit board 100 has a plurality of through holes TH, which are disposed corresponding to the chip 120.

In some embodiments, the antenna-in-package with the heat dissipation structure 10 further includes a heat dissipation block (heat slug) 134 disposed on the heat dissipation plate 132 and disposed in the through hole TH. In some embodiments, the heat dissipation block 134 penetrates the circuit board 100 and is in direct contact with the back surface 120*b* of the chip 120. In this way, the heat dissipation block 134 may conduct the heat generated by the chip 120 to the heat dissipation plate 132 and the heat dissipation fins 130, and then dissipate the heat energy to the outside of the chassis 140 through the dielectric fluid 150. However, the disclosure is not limited thereto. In other embodiments, a vapor chamber (not shown) or a thermal interface material (not shown) may be included between the chip 120 and the heat dissipation block 134 to enhance the heat dissipation effect of the chip 120.

FIG. 1A schematically shows that the heat dissipation fins and the heat dissipation blocks are disposed correspondingly, but it is not intended to limit the disclosure. The number and position of the heat dissipation fins may be adjusted according to actual requirements.

In some embodiments, the antenna-in-package with the heat dissipation structure 10 further includes a baffle 141, which is disposed on an inner surface of the chassis 140, and the circuit board 100 is fixedly disposed on the baffle 141. In this way, the circuit board 100, the baffle 141, and the heat dissipation plate 132 may divide the chassis 140 into a first space S11 and a second space S12. The first space S11 includes the circuit board 100, the antenna substrate 110, and the chip 120 disposed therein, and the second space S12 includes the heat dissipation plate 132 and the heat dissipation fins 130 disposed therein. In some embodiments, the dielectric fluid 150 flows in the second space S12 to contact the heat dissipation fins 130. In other words, the dielectric fluid 150 is not in direct contact with the antenna substrate 110 and the chip 120.

In some embodiments, the dielectric fluid 150 may include a non-conductive fluid such as silicone oil, mineral oil, or fluorinated liquid. Fluorinated liquid may refer to fluorine-containing alkanes, ethers, or ketone liquids. For example, the fluorinated liquid may be selected from the group consisting of methyl perfluoropropane ether, methyl nonafluoroisobutyl ether, and methyl nonafluorobutyl ether, 1,1,1,2,2,3,4,5,5,5-decafluoro-3-methoxy4-(trifluoromethyl)-pentane, 1,1,1,2,2,4,5,5,5-nonafluoro-4-(trifluoromethyl)-3-pentanone and combinations thereof.

In some embodiments, the materials of the heat dissipation fins 130, the heat dissipation plate 132, and the heat dissipation block 134 may be copper, aluminum, or other suitable thermally conductive materials.

FIG. 1B to FIG. 1D show some embodiments of the heat dissipation fins 130. In some embodiments, as shown in FIG. 1B, the heat dissipation fin 130 may include a first portion 130*a*, a second portion 130*b*, and a third portion 130*c*. The first portion 130*a* is in direct contact with the heat dissipation plate 132. The second portion 130*b* is located on a side wall of the first portion 130*a*. The third portion 130*c* is located on a bottom surface of the first portion 130*a*. The porosity of the third portion 130*c* is greater than the porosity of the second portion 130*b*. For example, the second portion 130*b* and the third portion 130*c* may be metal materials with holes, such as foamed metals. The second portion 130*b* may be a foamed metal with dense holes for increasing the contact area with the dielectric fluid so as to improve the heat conduction efficiency. The third portion 130*c* may be a foamed metal with loose holes for increasing the disturbance of the dielectric fluid flow and reducing the possibility of fluid stasis on the back of the fin.

In some embodiments, the porosity of the second portion 130*b* may be greater than or equal to the porosity of the first portion 130*a*. For example, the first portion 130*a* may be a metal material without holes, or the first portion 130*a* may also be a foamed metal and have a similar porosity to the second portion 130*b*.

In the embodiment of FIG. 1C, the heat dissipation fins 130 are similar to the embodiment of FIG. 1B. The second portion 130*b* may also extend to the bottom surface of the first portion 130*a*, so that the second portion 130*b* is located on the side wall and the bottom surface of the first portion 130*a*, and the third portion 130*c* may be located on a side wall and a bottom surface of the second portion 130*b*. That is to say, the second portion 130*b* is located between the first portion 130*a* and the third portion 130*c*, and the third portion 130*c* is not in direct contact with the first portion 130*a*.

In the embodiment of FIG. 1D, the heat dissipation fins 130 are similar to the embodiment of FIG. 1B. The third portion 130*c* may also extend to the side wall of the second portion 130*b*, so that the third portion 130*c* is in direct contact with the bottom surface and the side wall of the second portion 130*b* and the bottom surface of the first portion 130*a*.

However, the heat dissipation fins 130 of the disclosure are not limited to the embodiments of FIG. 1B to FIG. 1D. In other embodiments, the heat dissipation fins 130 may also be metal heat dissipation materials without holes.

In some embodiments, the heat dissipation plate 132 and the heat dissipation block 134 may be metal heat dissipation materials without holes.

In some other embodiments, the heat dissipation plate 132, the heat dissipation block 134 and/or the heat dissipation fins 130 may be a heat dissipation structure filled with a working fluid inside having phase change characteristics. Specifically, the heat dissipation structure is a metal chassis that encapsulates the working fluid inside. The metal chassis has a vacuum or near-vacuum sealed space inside and a capillary structure on the internal wall surface thereof, and the working fluid is located in the sealed space. When the vapor chamber structure is in contact with the heat source, the liquid phase working fluid absorbs heat and boils and vaporizes. Therefore, a pressure difference is created in the sealed space, causing the steam to flow to a lower temperature area. When the vapor phase working fluid is in contact with a relatively cold area, condensation will occur. Since the internal wall surface of the metal chassis has a capillary structure, the condensed working fluid may be guided back to the heat source. In this way, the working fluid may operate cyclically in a sealed space to achieve the purpose of heat dissipation. In some embodiments, the working fluid may be a fluid with a boiling point less than 70° C. under vacuum, but the disclosure is not limited thereto.

In some embodiments, the chassis 140 may include a main body portion 142 and a top cover portion 144. The main body portion 142 has an accommodating space constructed of side walls and a bottom plate, and the accommodating space is for components such as the circuit board 100, the antenna substrate 110, the heat dissipation plate 132, and the heat dissipation fins 130 to be disposed therein. The main body portion 142 has an opening, which at least corresponds to the antenna layer 112 of the antenna substrate 110. The top cover portion 144 is disposed in the opening of the main body portion 142 and is connected to the main body portion 142 to seal the accommodating space and encapsulate components such as the circuit board 100, the antenna substrate 110, the heat dissipation plate 132, and the heat dissipation fins 130 therein. The antenna substrate 110 is closer to the top cover portion 144 than the circuit board 100, and the upper surface 110*a* of the antenna substrate 110 faces the top cover portion 144.

In some embodiments, the material of the top cover portion 144 is different from the material of the main body portion 142. For example, the main body portion 142 may be a metal material to protect the antenna structure and have a favorable shielding effect on noise; the top cover portion 144 may be plastic insulating material such as PP polypropylene or other suitable non-magnetic materials, so that the antenna layer 112 may receive or transmit electromagnetic wave signals through the top cover portion 144.

Figure 2:
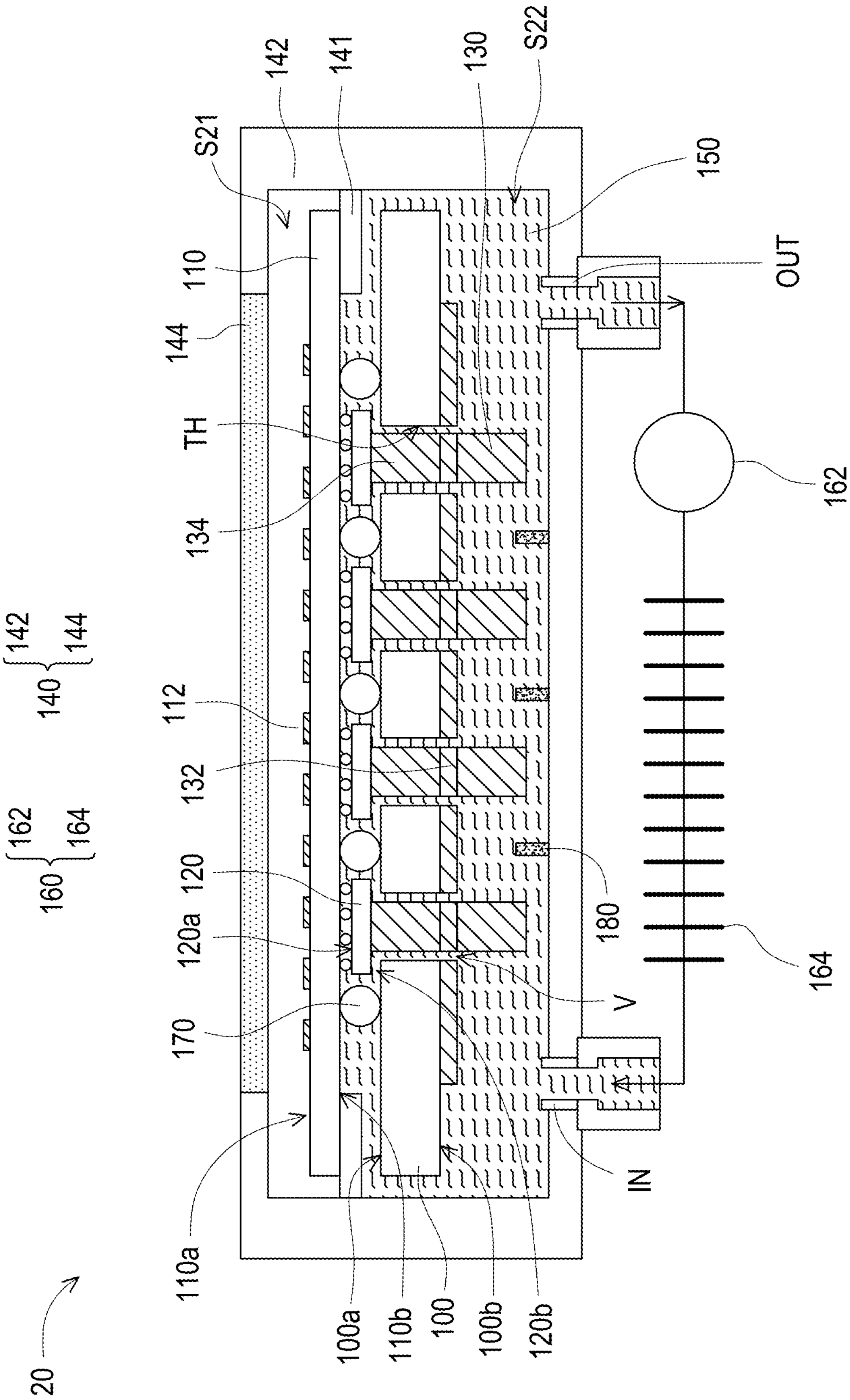
FIG. 2 is a schematic cross-sectional view of an antenna-in-package with a heat dissipation structure according to another embodiment of the disclosure.

FIG. 2 is a schematic cross-sectional view of an antenna-in-package with a heat dissipation structure according to another embodiment of the disclosure. The embodiment of FIG. 2 continues to use the referential numbers of the elements and a part of the content of the embodiment of FIG. 1, wherein the same or similar referential numbers are used to denote the same or similar elements, and the description of the same technical content are omitted. For the descriptions of the omitted part, reference may be made to the foregoing embodiments, and details are not repeated here.

Referring to FIG. 2. The difference between an antenna-in-package with a heat dissipation structure 20 of FIG. 2 and the antenna-in-package with the heat dissipation structure 10 of FIG. 1 is that the dielectric fluid 150 flows in the space surrounded by the antenna substrate 110, the baffle 141, and the chassis 140. Specifically, the baffle 141 of the antenna-in-package with the heat dissipation structure 20 is disposed on the inner surface of the chassis 140, and the lower surface 110*b* of the antenna substrate 110 is fixedly disposed on the baffle 141, so that the antenna substrate 110 and the baffle 141 divide the chassis 140 into a first space S21 and a second space S22. The first space S21 includes the antenna substrate 110 disposed therein and the antenna layer 112 is exposed in the first space S21. The second space S22 includes the circuit board 100, the chip 120, the heat dissipation plate 132, and the heat dissipation fins 130 disposed therein, and the dielectric fluid 150 flows in the second space S22. In other words, the dielectric fluid 150 may be in direct contact with the circuit board 100, the heat dissipation plate 132, the heat dissipation fins 130, and the chip 120. The dielectric fluid 150 may also be in direct contact with the conductive connecting member 170 to facilitate heat dissipation from the conductive connecting member 170.

In some embodiments, the dielectric fluid 150 may be in contact with the lower surface 110*b* of the antenna substrate 110 instead of the upper surface 110*a* of the antenna substrate 110. That is, the dielectric fluid 150 may not be in contact with the antenna layer 112.

In some embodiments, the heat dissipation plate 132 of the antenna-in-package with the heat dissipation structure 20 has a plurality of via holes V. The via holes V may be located around the heat dissipation block 134 and correspond to the through holes TH of the circuit board 100. Therefore, the dielectric fluid 150 may flow into the gap between the heat dissipation block 134 and the circuit board 100 through the plurality of via holes V, further allowing the dielectric fluid 150 to easily flow into the space between the circuit board 100 and the antenna substrate 110 (including the space between the chip 120 and the antenna substrate 110) so as to improve the heat dissipation efficiency of the conductive connecting member 170 and the chip 120. In other embodiments, the antenna-in-package with the heat dissipation structure 20 may not have the heat dissipation plate 132 and the heat dissipation block 134 such that the heat dissipation fins 130 of FIG. 2 are disposed in the through holes TH of the circuit board 100 and in direct or indirect contact with the chip 120 as shown in the heat dissipation fins 130 of the embodiment of FIG. 7 described later. In addition, in yet some other embodiments, the antenna-in-package with the heat dissipation structure 20 may not have the heat dissipation plate 132, the heat dissipation block 134, and the heat dissipation fins 130. Therefore, the through holes TH of the circuit board 100 has the dielectric fluid 150 passing through and contacting the chip 120.

In some embodiments, the heat dissipation fins 130 may be as shown in the foregoing embodiments of FIG. 1B to FIG. 1D and are not repeated here. In some embodiments, the surface or the entirety of the heat dissipation block 134 may also have a similar structure to the second portion 130*b* of the heat dissipation fins 130 shown in the foregoing embodiments of FIG. 1B to FIG. 1D. That is, the surface or the entirety of the heat dissipation block 134 may be a foamed metal with dense holes to improve heat conduction efficiency.

In some embodiments, the antenna-in-package with the heat dissipation structure 20 further includes a flow disturbing object 180 disposed on the inner surface of the chassis 140 and located between the inlet portion IN and the outlet portion OUT of the chassis 140 and in contact with the dielectric fluid 150 to promote the disturbance of the dielectric fluid 150 in the chassis 140 and reduce the possibility of fluid bypass. In some embodiments, the flow disturbing object 180 may be a foamed metal, so that the dielectric fluid 150 may pass through the holes of the flow disturbing object 180. The dead zone generated on a side of the flow disturbing object 180 facing away from the flow direction of the dielectric fluid 150 may be reduced, while the disturbance of the dielectric fluid 150 may be promoted at the same time, so that the dielectric fluid 150 may flow uniformly in the second space S22, and the heat in the second space S22 may be effectively taken away.

Three flow disturbing objects 180 are schematically shown in FIG. 2, but it is not intended to limit the disclosure. The number, size, and location of disposition of the flow disturbing objects 180 may be adjusted according to actual requirements.

Figure 3:
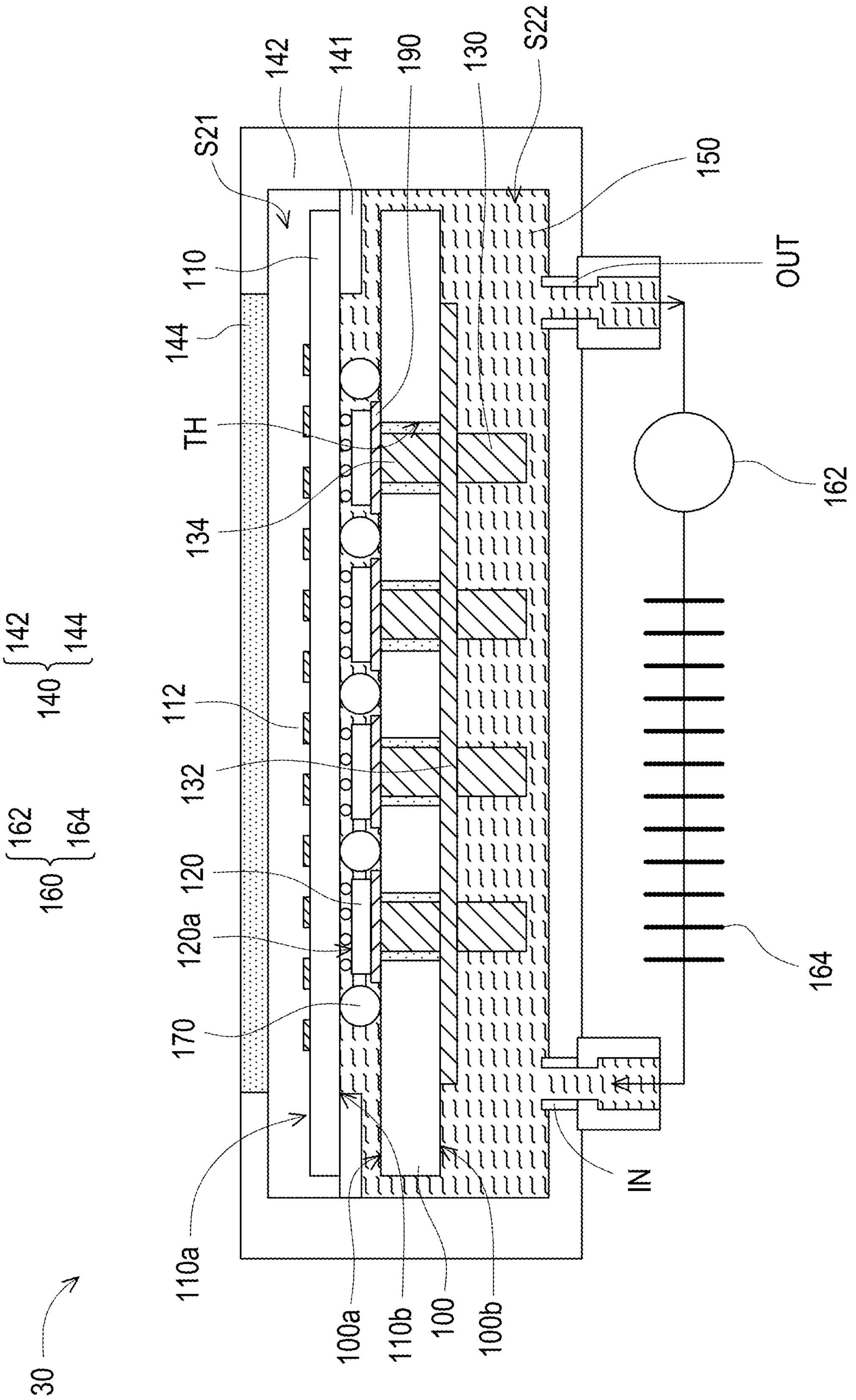
FIG. 3 is a schematic cross-sectional view of an antenna-in-package with a heat dissipation structure according to another embodiment of the disclosure.

FIG. 3 is a schematic cross-sectional view of an antenna-in-package with a heat dissipation structure according to another embodiment of the disclosure. The embodiment of FIG. 3 continues to use the referential numbers of the elements and a part of the content of the embodiment of FIG. 2, wherein the same or similar referential numbers are used to denote the same or similar elements, and the description of the same technical content are omitted. For the descriptions of the omitted part, reference may be made to the foregoing embodiments, and details are not repeated here.

Referring to FIG. 3. The difference between an antenna-in-package with a heat dissipation structure 30 of FIG. 3 and the antenna-in-package with the heat dissipation structure 20 of FIG. 2 is that the antenna-in-package with the heat dissipation structure 30 also includes a vapor chamber 190 disposed between the chip 120 and the heat dissipation block 134. In this way, the heat generated by the chip 120 may be first conducted to the vapor chamber 190, and then transmitted to the dielectric fluid 150 through the heat dissipation block 134, the heat dissipation plate 132, and the heat dissipation fins 130, and the heat energy may be dissipated to the outside of the chassis 140 through the dielectric fluid 150.

In FIG. 3, the vapor chamber 190 and the first surface 100*a* of the circuit board 100 may be in direct contact through a thermal interface material (TIM) (not shown), but it is not intended to limit the disclosure as long as the vapor chamber 190 may be attached to the back surface 120*b* of the chip 120. That is to say, in other embodiments, a gap may exist between the vapor chamber 190 and the first surface 100*a* of the circuit board 100.

In some embodiments, the dielectric fluid 150 may also be in direct contact with the vapor chamber 190.

In FIG. 3, the heat dissipation plate 132 is not disposed with a via hole, and the gap between the heat dissipation block 134 and the circuit board 100 may be filled with an insulated thermal interface material to promote heat conduction. However, it is not intended to limit the disclosure. The heat dissipation plate 132 may also have a plurality of via holes as shown in the embodiment of FIG. 2, so that the dielectric fluid may flow into the gap between the heat dissipation plate 132 and the circuit board 100.

Although there is no flow disturbing object shown in FIG. 3, the antenna-in-package with the heat dissipation structure 30 may also include a flow disturbing object to enhance the flow of the dielectric fluid 150 in the chassis 140.

Figure 4:
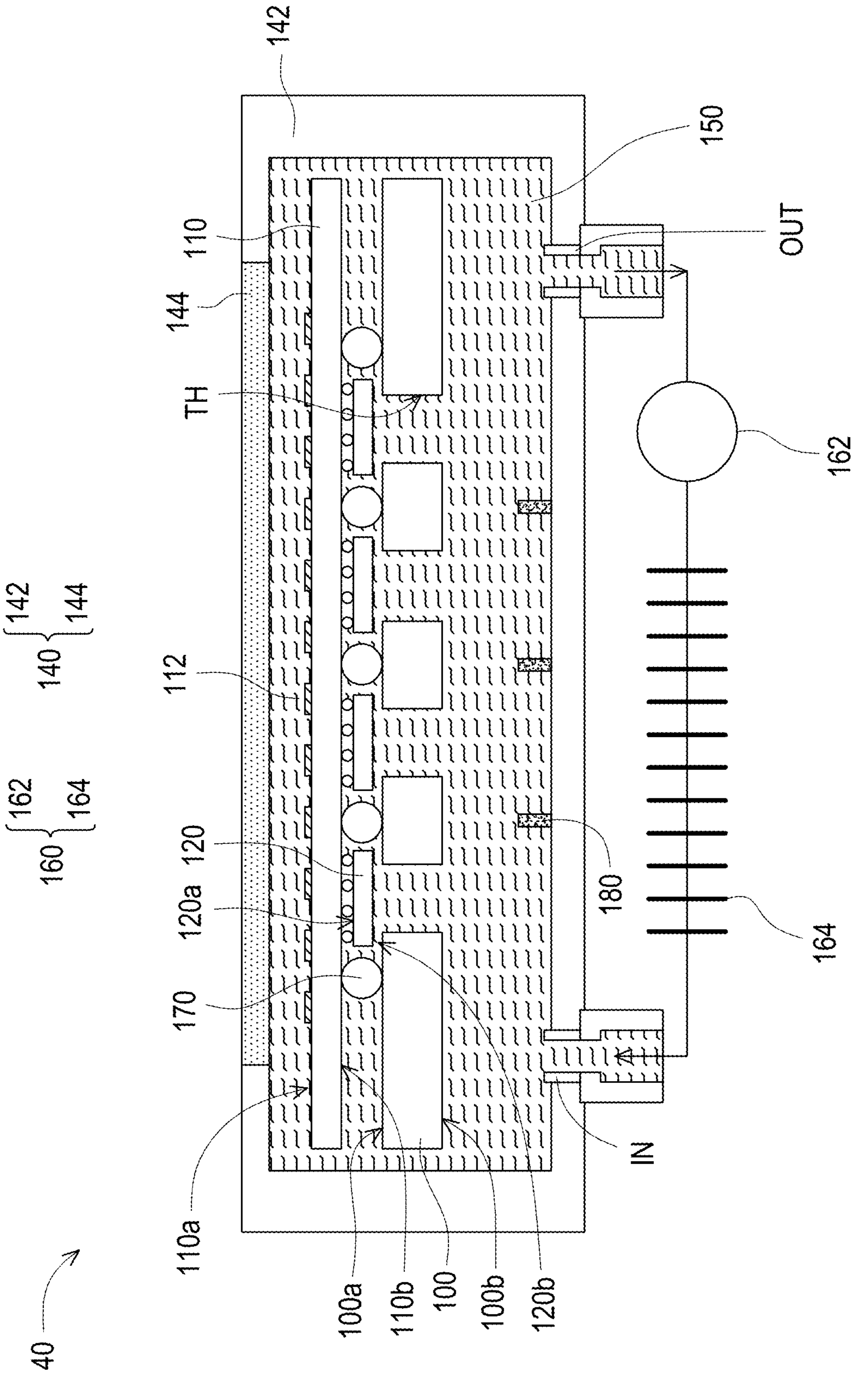
FIG. 4 is a schematic cross-sectional view of an antenna-in-package with a heat dissipation structure according to another embodiment of the disclosure.

FIG. 4 is a schematic cross-sectional view of an antenna-in-package with a heat dissipation structure according to another embodiment of the disclosure. The embodiment of FIG. 4 continues to use the referential numbers of the elements and a part of the content of the embodiment of FIG. 2, wherein the same or similar referential numbers are used to denote the same or similar elements, and the description of the same technical content are omitted. For the descriptions of the omitted part, reference may be made to the foregoing embodiments, and details are not repeated here.

Referring to FIG. 4, an antenna-in-package with a heat dissipation structure 40 includes the circuit board 100, the antenna substrate 110, the chip 120, the chassis 140, and the dielectric fluid 150. The circuit board 100 has the first surface 100*a* and the second surface 100*b* opposite to the first surface 100*a*. The antenna substrate 110 is disposed above the first surface 100*a* of the circuit board 100. The antenna substrate 110 includes the antenna layer 112 disposed on the upper surface 110*a* of the antenna substrate 110. The chip 120 is disposed between the antenna substrate 110 and the first surface 100*a* of the circuit board 100 and is electrically connected to the antenna substrate 110. The chassis 140 encapsulates the circuit board 100, the antenna substrate 110, and the chip 120. The dielectric fluid 150 circulates and flows in the chassis 140 through the cooling circulation device 160 and is in direct contact with the antenna layer 112.

In FIG. 4, since the circuit board 100, the antenna substrate 110, the chip 120, and the dielectric fluid 150 are all located in the same space of the chassis 140, the dielectric fluid 150 may flow throughout the chassis 140 and be in direct contact with the circuit board 100 and the antenna substrate 110, and the chip 120. The circuit board 100 and/or the antenna substrate 110 are fixedly disposed in the chassis 140, and the connection thereof with the chassis 140 is omitted in FIG. 4. In some embodiments, the circuit board 100 and/or the antenna substrate 110 may be fixedly disposed in the chassis 140 through support columns, bolts, etc., which is not limited in the disclosure.

In some embodiments, the dielectric fluid 150 may fill up the chassis 140.

In some embodiments, a vertical distance between the antenna layer 112 and the top cover portion 144 of the chassis 140 is less than 2 cm, for example, between 1.0 cm and 2.0 cm.

In FIG. 4, the through holes TH of the circuit board 100 has the dielectric fluid 150 passing through without a heat dissipation block or a heat dissipation fin being disposed, but the disclosure is not limited thereto. In other embodiments, the heat dissipation block or the heat dissipation fins may be disposed in the through holes TH of the circuit board 100.

Figure 5:
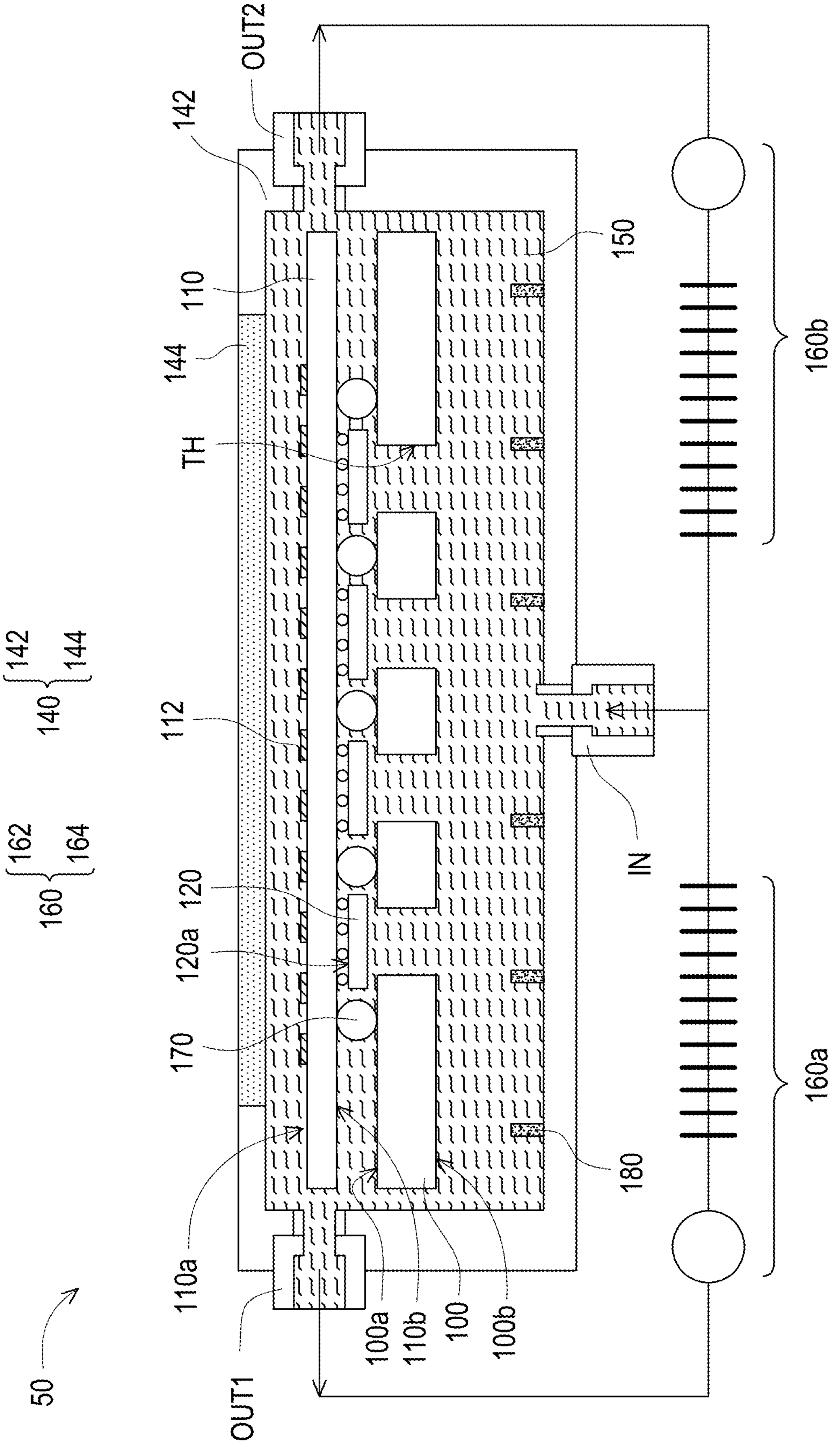
FIG. 5 is a schematic cross-sectional view of an antenna-in-package with a heat dissipation structure according to another embodiment of the disclosure.

FIG. 5 is a schematic cross-sectional view of an antenna-in-package with a heat dissipation structure according to another embodiment of the disclosure. The embodiment of FIG. 5 continues to use the referential numbers of the elements and a part of the content of the embodiment of FIG. 4, wherein the same or similar referential numbers are used to denote the same or similar elements, and the description of the same technical content are omitted. For the descriptions of the omitted part, reference may be made to the foregoing embodiments, and details are not repeated here.

Referring to FIG. 5, the difference between an antenna-in-package with a heat dissipation structure 50 of FIG. 5 and the antenna-in-package with the heat dissipation structure 40 of FIG. 4 is that the chassis 140 of the antenna-in-package with the heat dissipation structure 50 includes the inlet portion IN and two outlet portions OUT1 and OUT2. The inlet portion IN is disposed on the bottom plate of the chassis 140, and the outlet portions OUT1 and OUT2 are disposed on the side walls of the chassis 140. In some embodiments, the outlet portion OUT1 and the outlet portion OUT2 are opposite to each other, but the disclosure is not limited thereto.

In some embodiments, a cooling circulation device 160*a* may be disposed on the outside of the chassis 140 between the outlet portion OUT1 and the inlet portion IN. A cooling circulation device 160*b* may be disposed on the outside of the chassis 140 between the outlet portion OUT2 and the inlet portion IN, so that the dielectric fluid 150 flowing out from different outlet portions may dissipate heat through different cooling circulation devices and then return to the inside of the chassis 140. However, the disclosure is not limited thereto. The dielectric fluid 150 flowing out from different outlet portions may also be merged into one through pipeline design and returned to the inside of the chassis 140 through a single cooling circulation device.

Figure 6:
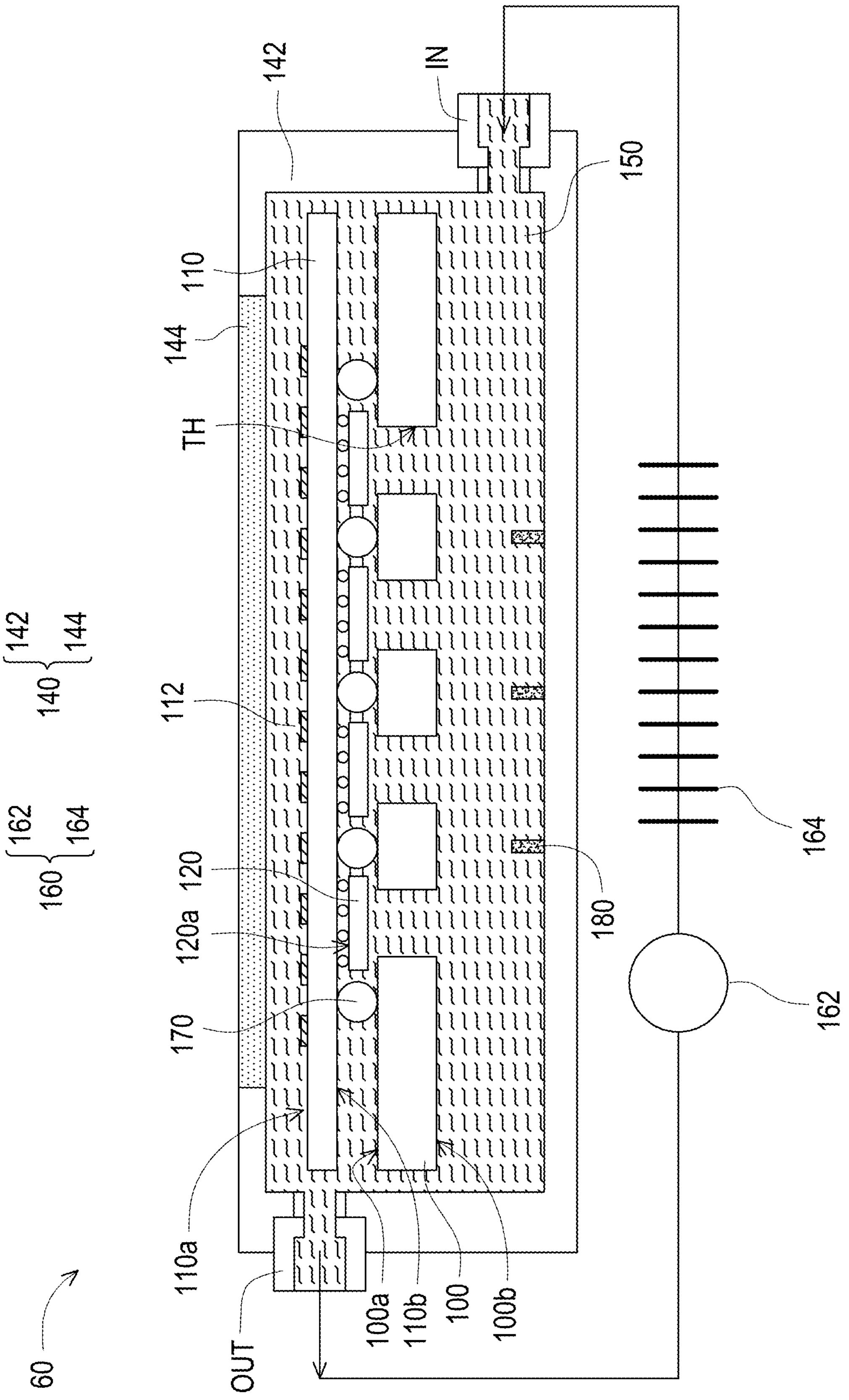
FIG. 6 is a schematic cross-sectional view of an antenna-in-package with a heat dissipation structure according to another embodiment of the disclosure.

FIG. 6 is a schematic cross-sectional view of an antenna-in-package with a heat dissipation structure according to another embodiment of the disclosure. The embodiment of FIG. 6 continues to use the referential numbers of the elements and a part of the content of the embodiment of FIG. 4, wherein the same or similar referential numbers are used to denote the same or similar elements, and the description of the same technical content are omitted. For the descriptions of the omitted part, reference may be made to the foregoing embodiments, and details are not repeated here.

Referring to FIG. 6, the difference between an antenna-in-package with a heat dissipation structure 60 of FIG. 6 and the antenna-in-package with the heat dissipation structure 40 of FIG. 4 is that the inlet portion IN and the outlet portion OUT are respectively disposed on the opposite side walls of the chassis 140, and the position of the outlet portion OUT is higher than the position of the inlet portion IN.

Figure 7:
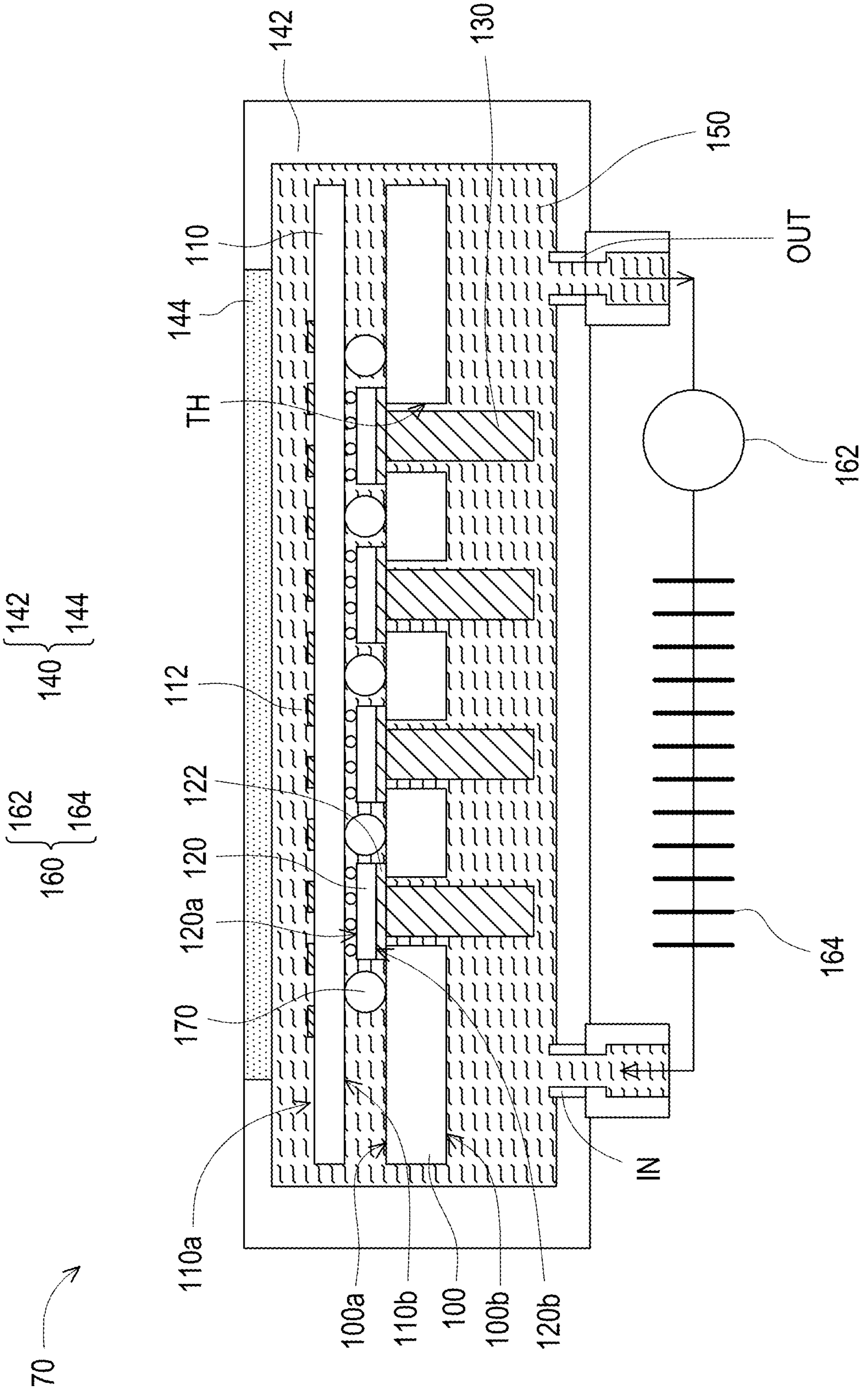
FIG. 7 is a schematic cross-sectional view of an antenna-in-package with a heat dissipation structure according to another embodiment of the disclosure.

FIG. 7 is a schematic cross-sectional view of an antenna-in-package with a heat dissipation structure according to another embodiment of the disclosure. The embodiment of FIG. 7 continues to use the referential numbers of the elements and a part of the content of the embodiment of FIG. 4, wherein the same or similar referential numbers are used to denote the same or similar elements, and the description of the same technical content are omitted. For the descriptions of the omitted part, reference may be made to the foregoing embodiments, and details are not repeated here.

Referring to FIG. 7, the difference between an antenna-in-package with a heat dissipation structure 70 of FIG. 7 and the antenna-in-package with the heat dissipation structure 40 of FIG. 4 is that the antenna-in-package with the heat dissipation structure 70 also includes the heat dissipation fins 130 disposed in the through holes TH of the circuit board 100. The heat dissipation fins 130 may protrude from the second surface 100*b* of the circuit board 100 to promote the disturbance of the dielectric fluid 150 and improve the heat dissipation efficiency.

In some embodiments, the heat dissipation fins 130 may include foamed metals. For example, the heat dissipation fins 130 may be as shown in the embodiments of FIG. 1B to FIG. 1D.

In some embodiments, there is a gap between the heat dissipation fins 130 and the circuit board 100, so that the dielectric fluid 150 may flow therein, and the dielectric fluid 150 may easily flow into the space between the antenna substrate 110 and the circuit board 100.

In some embodiments, the back surface 120*b* of the chip 120 may include a thermal interface material layer 122 to facilitate the connection with the heat dissipation fins 130, but the disclosure is not limited thereto. In other embodiments, the heat dissipation fins 130 may be in direct contact with the back surface 120*b* of the chip 120. In yet some other embodiments, a vapor chamber (not shown) may be disposed between the heat dissipation fins 130 and the back surface 120*b* of the chip 120.

In some embodiments, the thermal interface material layer 122 may be thermally conductive glue, a thermal pad, or other suitable thermal interface materials.

Although there is no flow disturbing object shown in FIG. 7, the antenna-in-package with the heat dissipation structure 70 may also include the flow disturbing object to enhance the disturbance of the dielectric fluid 150 in the chassis 140.

Figure 8:
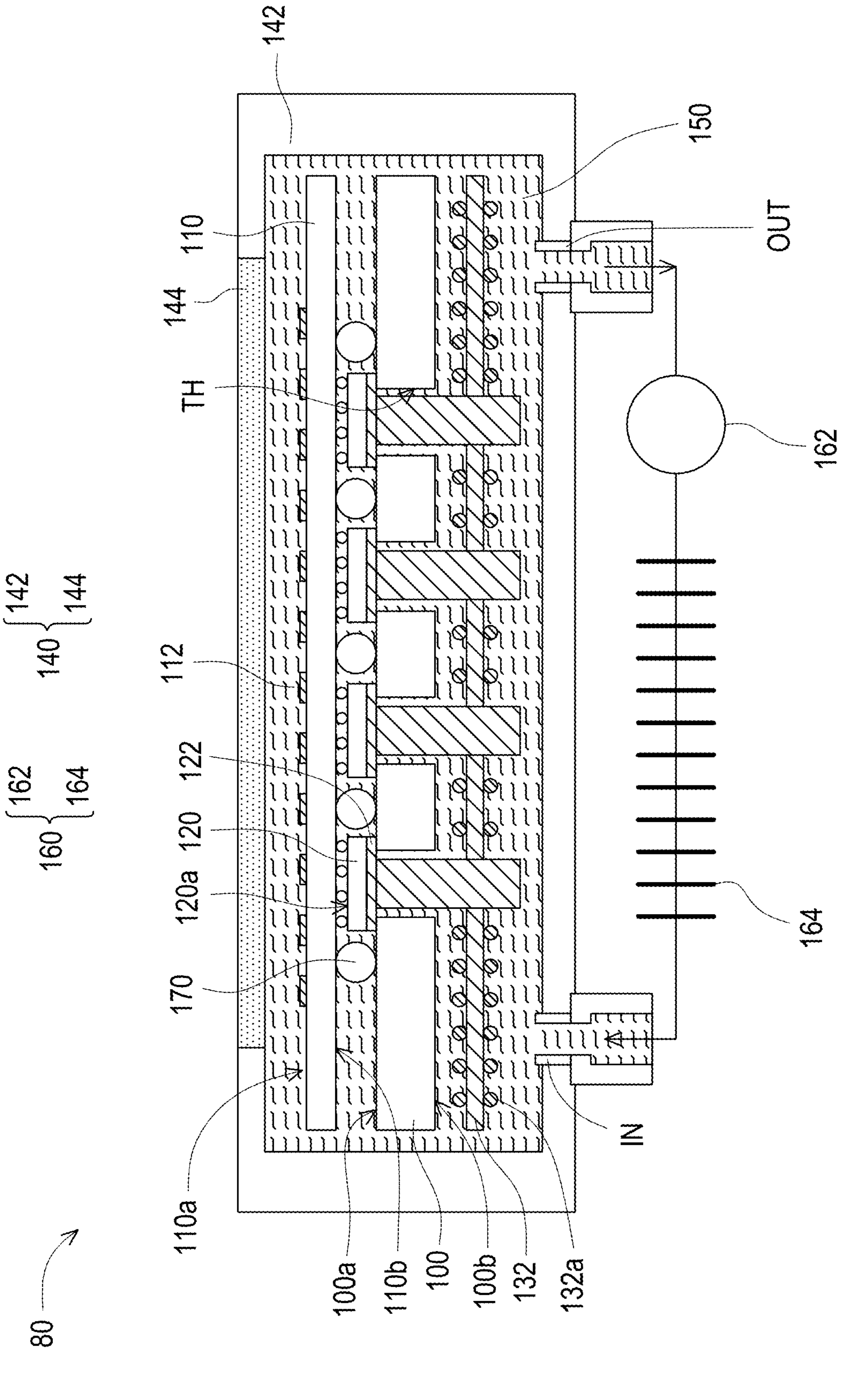
FIG. 8 is a schematic cross-sectional view of an antenna-in-package with a heat dissipation structure according to another embodiment of the disclosure.

FIG. 8 is a schematic cross-sectional view of an antenna-in-package with a heat dissipation structure according to another embodiment of the disclosure. The embodiment of FIG. 8 continues to use the referential numbers of the elements and a part of the content of the embodiment of FIG. 7, wherein the same or similar referential numbers are used to denote the same or similar elements, and the description of the same technical content are omitted. For the descriptions of the omitted part, reference may be made to the foregoing embodiments, and details are not repeated here.

Referring to FIG. 8, the difference between an antenna-in-package with a heat dissipation structure 80 of FIG. 8 and the antenna-in-package with the heat dissipation structure 70 of FIG. 7 is that the antenna-in-package with the heat dissipation structure 80 also includes the heat dissipation plate 132. The heat dissipation plate 132 is disposed above the second surface 100*b* of the circuit board 100 and connected to the heat dissipation fins 130. The surface of the heat dissipation plate 132 includes a plurality of micro-bumps 132*a* or micro-dimples (for example, corresponding to the recessed area between two micro-bumps) to help promote the flow of the dielectric fluid 150 in the chassis 140. The disclosure does not limit the shape of the micro-bumps 132*a*, which may be columnar, spherical, hemispherical, etc., or the corresponding bump shape may be formed by forming micro-dimples.

In some embodiments, the heat dissipation plate 132 may be a foamed metal to promote disturbance and heat conduction of the dielectric fluid 150 within the chassis 140.

In some embodiments, there is a gap between the heat dissipation plate 132 and the second surface 100*b* of the circuit board 100. Therefore, the dielectric fluid 150 may flow into the gap, thereby allowing the dielectric fluid 150 to flow through the gap between the circuit board and the heat dissipation fins 130 and further flow into the space between the antenna substrate 110 and the circuit board 100 so as to improve the heat dissipation efficiency of the chip 120.

FIG. 8 schematically shows the inlet portion IN and the outlet portion OUT at the lower part of the chassis 140, but the disclosure is not limited thereto. The number and position of the inlet portion and outlet portion of the chassis 140 may be adjusted according to actual requirements. In some embodiments, the inlet portion and the outlet portion of the chassis 140 may be configured similar to the embodiment of FIG. 5 or FIG. 6.

Although there is no flow disturbing object shown in FIG. 8, the antenna-in-package with the heat dissipation structure 80 may also include the flow disturbing object to enhance the disturbance of the dielectric fluid 150 in the chassis 140.

Figure 9:
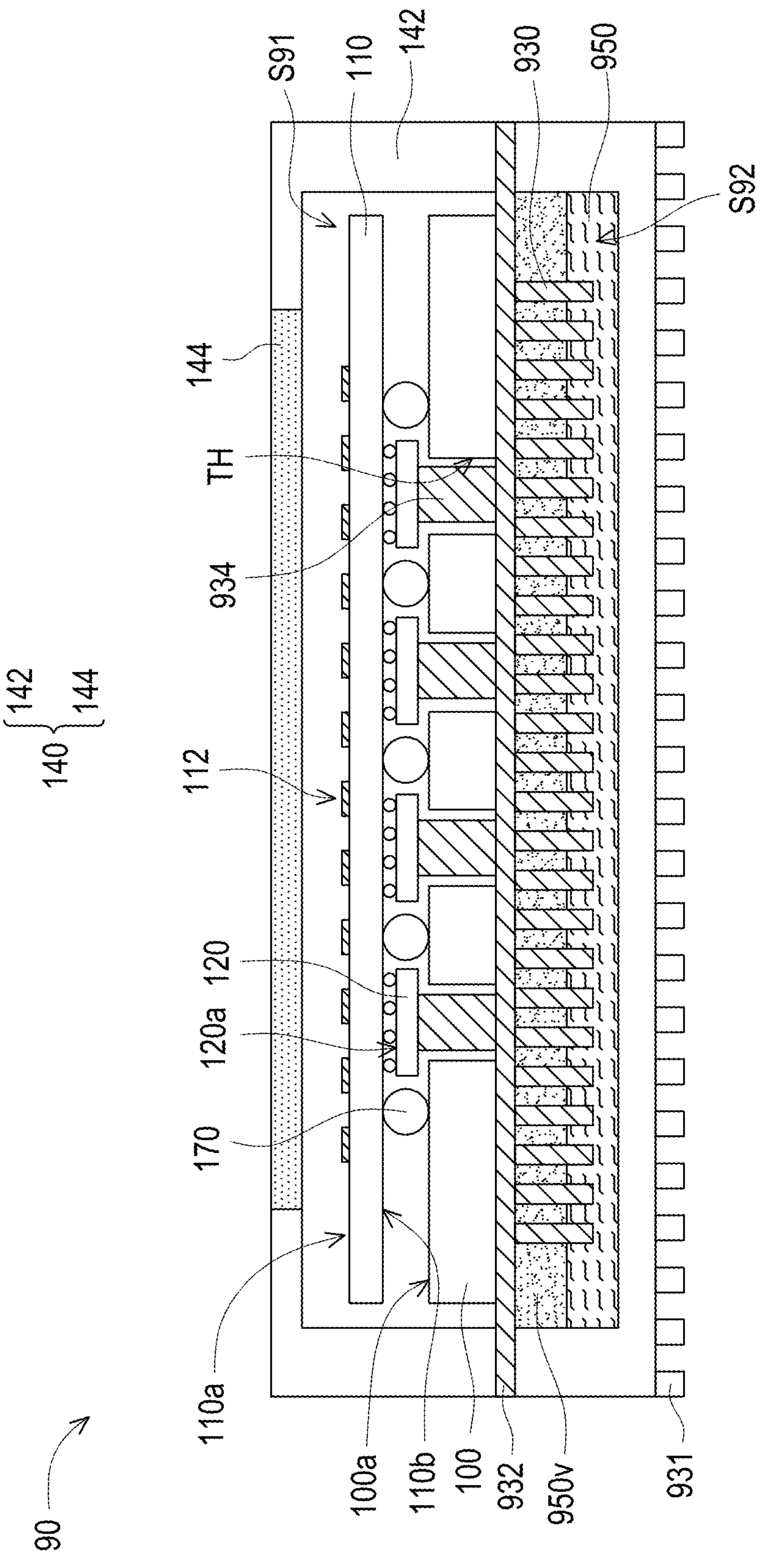
FIG. 9 is a schematic cross-sectional view of an antenna-in-package with a heat dissipation structure according to another embodiment of the disclosure.

FIG. 9 is a schematic cross-sectional view of an antenna-in-package with a heat dissipation structure according to another embodiment of the disclosure. The embodiment of FIG. 9 continues to use the referential numbers of the elements and a part of the content of the embodiment of FIG. 1, wherein the same or similar referential numbers are used to denote the same or similar elements, and the description of the same technical content are omitted. For the descriptions of the omitted part, reference may be made to the foregoing embodiments, and details are not repeated here.

Referring to FIG. 9, an antenna-in-package with a heat dissipation structure 90 includes the circuit board 100, the antenna substrate 110, the chip 120, a plurality of heat dissipation fins 930, the chassis 140, and cooling fluid 950. The chassis 140 includes a first space S91 and a second space S92. The first space S91 and the second space S92 are isolated from each other by a heat dissipation plate 932. The circuit board 100 is located in the first space S91 and is disposed on the heat dissipation plate 932. The antenna substrate 110 is located in the first space S91 and is disposed above the circuit board 100. The chip 120 is disposed between the antenna substrate 110 and the circuit board 100 and is electrically connected to the antenna substrate 110. The heat dissipation fins 930 are located in the second space S92 and disposed on the heat dissipation plate 932. The cooling fluid 950 is located in the second space S92 and is in contact with the heat dissipation fins 930. The cooling fluid 950 absorbs heat from the heat dissipation fins 930 to create a phase change.

The cooling fluid 950 is in a state where the vapor phase and the liquid phase coexist in the second space S92. Specifically, the cooling fluid 950 may not fill up the second space S92, but may be in direct contact with at least part of the heat dissipation fins 930, so that part of the liquid phase cooling fluid 950 absorbs heat from the heat dissipation fins 930 and vaporizes to form steam 950*v*. The generation of steam creates a pressure difference in the second space S92, which prompts the steam to flow to a lower temperature area, and then to condense again into the liquid phase cooling fluid 950. Such a cyclic operation may effectively conduct heat quickly.

A pressure of the second space S92 may be less than one atmosphere. In some embodiments, the second space S92 may be in a near vacuum state. In some embodiments, the pressure of the second space S92 is less than the pressure of the first space S91.

In some embodiments, the cooling fluid 950 may be a volatile liquid with a low boiling point, such as ethanol, ammonia, perfluorocarbon, perfluoropolyether, or other suitable cooling fluid. In some embodiments, the boiling point of the cooling fluid 950 in the second space S92 may be less than 70° C., for example, between 50° C. and 60° C., so as to improve the heat dissipation effect of the chip 120.

In some embodiments, the antenna-in-package with the heat dissipation structure 90 further includes a heat dissipation block 934 disposed on the heat dissipation plate 932 and disposed in the through hole TH. In some embodiments, the heat dissipation block 934 penetrates the circuit board 100 and is in direct contact with the back surface 120*b* of the chip 120. In this way, the heat dissipation block 934 may conduct the heat generated by the chip 120 to the heat dissipation fins 930. Then, the cooling fluid 950 may continuously circulate in the second space S92 to perform phase changes between liquid and vapor, so as to effectively conduct away the heat generated by the chip 120.

In some embodiments, the heat dissipation plate 932, the heat dissipation fins 930, and the heat dissipation block 934 are metal materials without holes. In some embodiments, the material of the heat dissipation plate 132, the heat dissipation fins 930, and the heat dissipation block 934 may be copper, aluminum, or other suitable thermally conductive materials.

In some embodiments, a vapor chamber (not shown) may be included between the chip 120 and the heat dissipation block 934 to enhance the heat dissipation effect of the chip 120. In some embodiments, a thermal interface material (not shown) may be included between the chip 120 and the heat dissipation block 934 to enhance the connection between the chip 120 and the heat dissipation block 934.

In some embodiments, the antenna-in-package with the heat dissipation structure 90 further includes external fins 931, which are disposed on an outer surface of the chassis 140 and disposed corresponding to the second space S92. In this way, the heat of the cooling fluid 950 may further dissipate to the outside of the chassis 140 through the external fins 931.

In some embodiments, the surface of the heat dissipation fins 930 may have microstructures (not shown) for increasing the surface roughness thereof to assist the boiling of the cooling fluid 950, so that the vaporized steam may easily escape from the surfaces of the heat dissipation fins 930 to allow the cooling fluid 950 to smoothly undergo a phase change cycle. In some embodiments, the microstructures may be formed by laying metal micro particles on the surfaces of the heat dissipation fins 930, but the disclosure is not limited thereto.

In summary, the antenna-in-package with the heat dissipation structure of the disclosure improves the heat dissipation efficiency thereof through the provision of dielectric fluid or cooling fluid, so that the antenna-in-package with the heat dissipation structure is adapted for application in the 5G communications industry and low-orbit satellite ground stations.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. An antenna-in-package with a heat dissipation structure, comprising:

a circuit board, having a first surface and a second surface opposite to the first surface;

an antenna substrate, disposed above the first surface of the circuit board;

a chip, disposed between the antenna substrate and the first surface of the circuit board, and electrically connected to the antenna substrate;

a plurality of heat dissipation fins, protruding from the second surface of the circuit board;

a chassis, encapsulating the circuit board, the antenna substrate, the chip, and the plurality of heat dissipation fins; and dielectric fluid, circulating and flowing in the chassis through a cooling circulation device, and being in direct contact with the plurality of heat dissipation fins.

2. The antenna-in-package with the heat dissipation structure according to claim 1, further comprising:

a heat dissipation plate, disposed on the second surface of the circuit board, wherein the plurality of heat dissipation fins are disposed on the heat dissipation plate, and the dielectric fluid is in direct contact with the heat dissipation plate.

3. The antenna-in-package with the heat dissipation structure according to claim 2, further comprising:

a baffle, disposed on an inner surface of the chassis, wherein the circuit board is fixedly disposed on the baffle, and the dielectric fluid flows in a space surrounded by the circuit board, the baffle, the heat dissipation plate, and the chassis to be in direct contact with the plurality of heat dissipation fins.

4. The antenna-in-package with the heat dissipation structure according to claim 2, further comprising:

a heat dissipation block, disposed on the heat dissipation plate, and penetrating the circuit board.

5. The antenna-in-package with the heat dissipation structure according to claim 4, further comprising:

a baffle, disposed on an inner surface of the chassis, wherein the antenna substrate is fixedly disposed on the baffle, and the dielectric fluid flows in a space surrounded by the antenna substrate, the baffle, and the chassis to be in direct contact with the plurality of heat dissipation fins.

6. The antenna-in-package with the heat dissipation structure according to claim 5, wherein the heat dissipation plate has a plurality of via holes, and the dielectric fluid flows into a gap between the heat dissipation block and the circuit board through the plurality of via holes.

7. The antenna-in-package with the heat dissipation structure according to claim 5, wherein the dielectric fluid is in direct contact with the chip.

8. The antenna-in-package with the heat dissipation structure according to claim 1, wherein the antenna substrate comprises an antenna layer disposed on an upper surface of the antenna substrate, and the antenna layer is not in contact with the dielectric fluid.

9. The antenna-in-package with the heat dissipation structure according to claim 1, further comprising:

a vapor chamber, disposed on a back surface of the chip.

10. The antenna-in-package with the heat dissipation structure according to claim 1, wherein the chassis comprises at least one inlet portion and at least one outlet portion, the cooling circulation device comprises a pump and a heat exchanger that are disposed on an outside of the chassis, the dielectric fluid is drawn out from the at least one outlet portion of the chassis by the pump and passed through the heat exchanger to dissipate heat of the dielectric fluid to the outside, and the dielectric fluid flowing through the heat exchanger is then returned to an inside of the chassis through the at least one inlet portion.

11. The antenna-in-package with the heat dissipation structure according to claim 1, wherein each of the plurality of heat dissipation fins comprises:

a first portion, being in direct contact with a heat dissipation plate;

a second portion, located on a side wall of the first portion; and a third portion, located above a bottom surface of the first portion, wherein a porosity of the third portion is greater than a porosity of the second portion.

12. The antenna-in-package with the heat dissipation structure according to claim 1, wherein the dielectric fluid comprises silicone oil, mineral oil, or fluorinated liquid.

13. An antenna-in-package with a heat dissipation structure, comprising:

a circuit board, having a first surface and a second surface opposite to the first surface;

an antenna substrate, disposed above the first surface of the circuit board, wherein the antenna substrate comprises an antenna layer disposed on a surface of the antenna substrate;

a chip, disposed between the antenna substrate and the first surface of the circuit board, and electrically connected to the antenna substrate;

a chassis, encapsulating the circuit board, the antenna substrate, and the chip;

dielectric fluid, circulating and flowing in the chassis through a cooling circulation device, and being in direct contact with the antenna layer.

14. The antenna-in-package with the heat dissipation structure according to claim 13, wherein the circuit board has a through hole corresponding to the chip, and the dielectric fluid flows through the through hole and is in contact with the chip.

15. The antenna-in-package with the heat dissipation structure according to claim 14, further comprising:

a heat dissipation fin, disposed in the through hole of the circuit board, and protruding from the second surface of the circuit board.

16. The antenna-in-package with the heat dissipation structure according to claim 15, wherein the heat dissipation fin comprises a foamed metal.

17. The antenna-in-package with the heat dissipation structure according to claim 15, further comprising:

a heat dissipation plate, disposed above the second surface of the circuit board, and connected to the heat dissipation fin, wherein a surface of the heat dissipation plate comprises a plurality of micro-bumps or micro-dimples.

18. The antenna-in-package with the heat dissipation structure according to claim 17, wherein the dielectric fluid flows through a space between the heat dissipation plate and the circuit board.

19. The antenna-in-package with the heat dissipation structure according to claim 13, wherein the chassis comprises at least one inlet portion and at least one outlet portion, the cooling circulation device comprises a pump and a heat exchanger that are disposed on an outside of the chassis, the dielectric fluid is drawn out from the at least one outlet portion of the chassis by the pump and passed through the heat exchanger to dissipate heat of the dielectric fluid to the outside, and the dielectric fluid flowing through the heat exchanger is then returned to an inside of the chassis through the at least one inlet portion.

20. The antenna-in-package with the heat dissipation structure according to claim 19, further comprising:

a flow disturbing object, disposed on an inner surface of the chassis, and located between the at least one inlet portion and the at least one outlet portion of the chassis to promote a disturbance of the dielectric fluid in the chassis, wherein the flow disturbing object is a foamed metal.

21. An antenna-in-package with a heat dissipation structure, comprising:

a chassis, comprising a first space and a second space, wherein the first space and the second space are isolated from each other by a heat dissipation plate;

a circuit board, located in the first space, and disposed on the heat dissipation plate;

an antenna substrate, located in the first space, and disposed on the circuit board;

a chip, disposed between the antenna substrate and the circuit board, and electrically connected to the antenna substrate;

a heat dissipation fin, located in the second space, and disposed on the heat dissipation plate; and cooling fluid, located in the second space, and being in contact with the heat dissipation fin, wherein the cooling fluid absorbs heat from the heat dissipation fin to create a phase change.

22. The antenna-in-package with the heat dissipation structure according to claim 21, wherein a pressure of the second space is less than one atmosphere.

23. The antenna-in-package with the heat dissipation structure according to claim 21, wherein the cooling fluid comprises ethanol, ammonia, perfluorocarbon, or perfluoropolyether.

24. The antenna-in-package with the heat dissipation structure according to claim 21, wherein the cooling fluid is in a state where a vapor phase and a liquid phase coexist in the second space.

25. The antenna-in-package with the heat dissipation structure according to claim 21, wherein a surface of the heat dissipation fin has a microstructure to increase a surface roughness of the heat dissipation fin.

26. The antenna-in-package with the heat dissipation structure according to claim 21, further comprising:

a heat dissipation block, disposed on the heat dissipation plate, and penetrating the circuit board to be in contact with the chip.

* * * * *